United States Patent [19]

Solaroli

[11] Patent Number: 5,411,056

[45] Date of Patent: May 2, 1995

[54] PRESSURE RELIEF VALVE

[75] Inventor: Alberto Solaroli, Newcastle, Canada

[73] Assignee: 432583 B.C. Ltd., Vancouver, Canada

[21] Appl. No.: 164,446

[22] Filed: Dec. 9, 1993

[51] Int. Cl.6 ............................................. F16K 15/03
[52] U.S. Cl. ............................ 137/527.4; 137/516.29; 251/86; 251/363
[58] Field of Search ............ 137/527.4, 527.8, 516.29; 251/86, 363

[56] References Cited

U.S. PATENT DOCUMENTS

| | | | |
|---|---|---|---|
| 430,301 | 6/1890 | Scheck | 251/86 X |
| 4,116,419 | 9/1978 | Diehl | 251/363 X |
| 4,586,534 | 5/1986 | McNeely | 137/516.29 X |
| 4,674,575 | 6/1987 | Guess | 137/516.29 X |
| 4,856,547 | 8/1989 | Solaroli | 137/73 |

FOREIGN PATENT DOCUMENTS 848682 9/1960 United Kingdom .................. 251/86

*Primary Examiner*—Robert G. Nilson
*Attorney, Agent, or Firm*—Ridout & Maybee

[57] ABSTRACT

A pressure relief valve, for pressurized fluid storage vessels such as a rail tank car for volatile liquids, has a flap valve for rotational movement in a valve passage between a closed position seated on a valve seat and blocking the passage and an open position in which the passage is substantially unobstructed. A spring arrangement for keeping the valve closed against a rated pressure includes an externally mounted spring system which, when exposed to fire conditions which might threaten the wall strength of the vessel, loses spring temper so as to reduce the closing pressure of the valve. The flap valve is supported through an arm by a ball joint allowing a limited pivotal movement, and the valve seat is located in the valve passage by an O-ring allowing a limited degree of float in its own plane.

4 Claims, 2 Drawing Sheets

PRESSURE RELIEF VALVE

BACKGROUND OF THE INVENTION

1. Field of the Invention

This invention relates to pressure relief valves for vessels containing pressurized fluids.

2. Review of the Art

In my U.S. Pat. No. 4,856,547 issued Aug. 15, 1989, I disclose an emergency pressure relief valve for a vessel containing pressurised fluid which comprises a valve body defining a valve passage through the body from a first end communicable with the interior of the vessel to a second end communicable with the ambient atmosphere, a valve seat surrounding the passage, a flap valve, a shaft supporting the flap valve for rotation about an axis perpendicular to a longitudinal axis of the passage between a first position closing the passage and in fluid tight engagement with the valve seat and a second position within the body in which it does not substantially obstruct the passage, and spring means acting between the shaft and the body to urge the flap valve into said first position with a torque sufficient to retain the flap valve in said first position when the pressure difference between the first and second ends of the passage is less than a predetermined value, the spring means including a spring disposed for exposure to the thermal ambience of the vessel to which the valve is applied, the spring being made of a material which loses its spring temper on exposure to a thermal ambience likely to result in substantial weakening of walls of the pressure vessel, whereby substantially to reduce the total closing torque applied by said spring means to the valve after exposure of the spring to such a thermal ambience.

Preferably the spring means comprises multiple springs acting in parallel on said flap including a first spring which is the spring exposed to the thermal ambience of the vessel, and at least one further spring sufficiently protected from the thermal ambience of the vessel to maintain a predetermined minimum closing torque on said flap valve after said first spring has lost its spring temper.

Testing has shown this valve to function satisfactorily, but there can be difficulty in obtaining satisfactory seating of the valve during manufacture, and in maintaining this seating during installation and in service, and over the full range of operating temperature of the valve.

SUMMARY OF THE INVENTION

It is an object of the present invention to address this problem.

I have determined that by forming the flap valve in two separate parts, namely the valve disk and its supporting arm, and connecting the two by a universal joint preventing a limited degree of play between the parts, obtaining and maintaining accurate seating of the valve becomes much less critical.

Preferably also the valve seat is located within a slightly oversize cylindrical bore by a peripheral O-ring which not only provides a gas seal around the seat but also allows a small degree of float of the seat in its own place, thus further improving seating of the valve.

Further features of the invention will be apparent from the following description of a preferred embodiment thereof.

SHORT DESCRIPTION OF THE DRAWINGS

In the drawings;

FIG. 1 shows a plan view of a relief valve in accordance with the invention, in a closed condition and particularly broken array to show certain internal parts; and FIG. 2 shows a vertical diametrical section through the relief valve, in a closed condition but showing in broken lines the position assumed by a flap valve and certain associated parts when the relief valve is partially open.

DESCRIPTION OF THE PREFERRED EMBODIMENT

Figure 1:
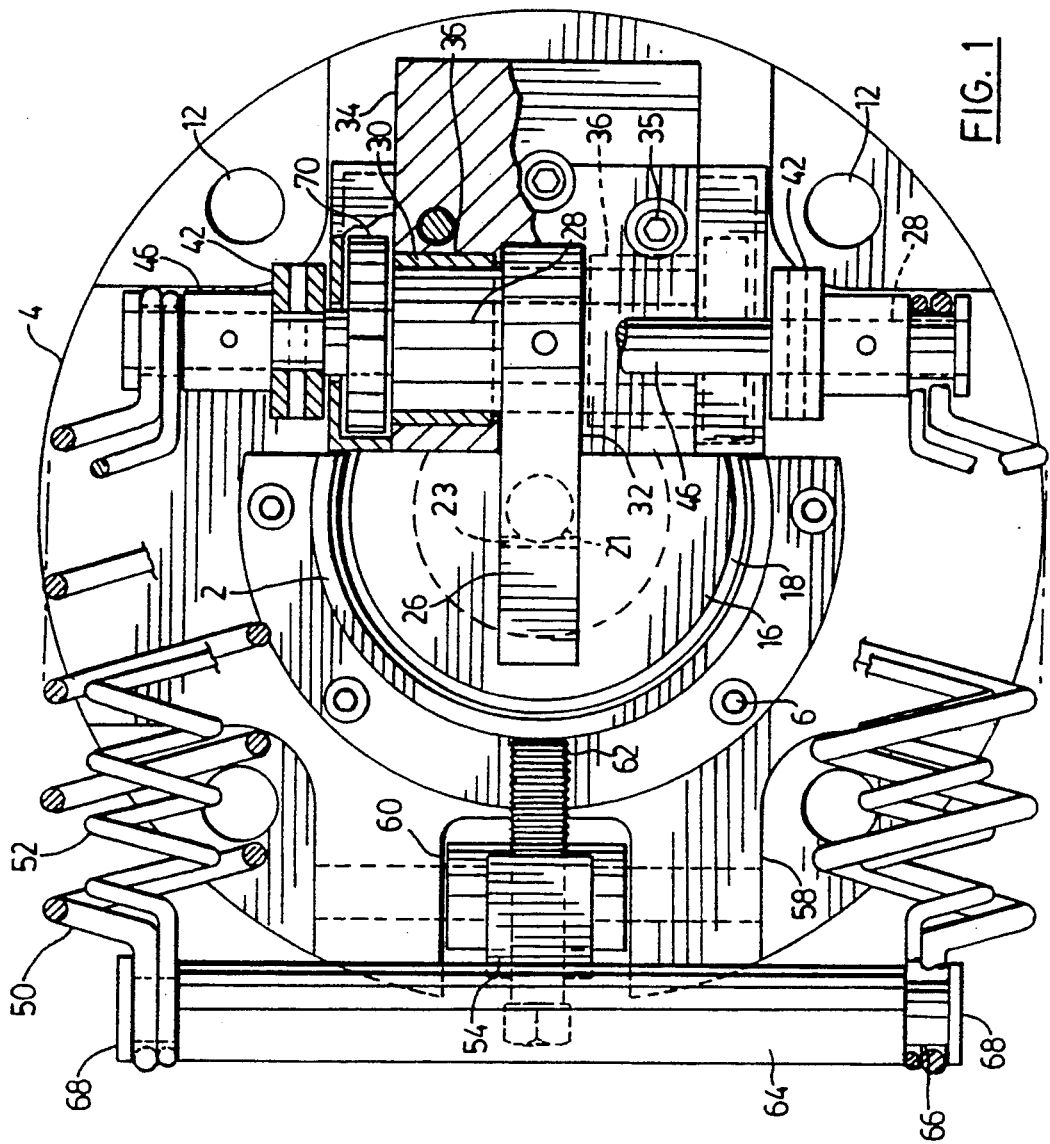
Figure 2:
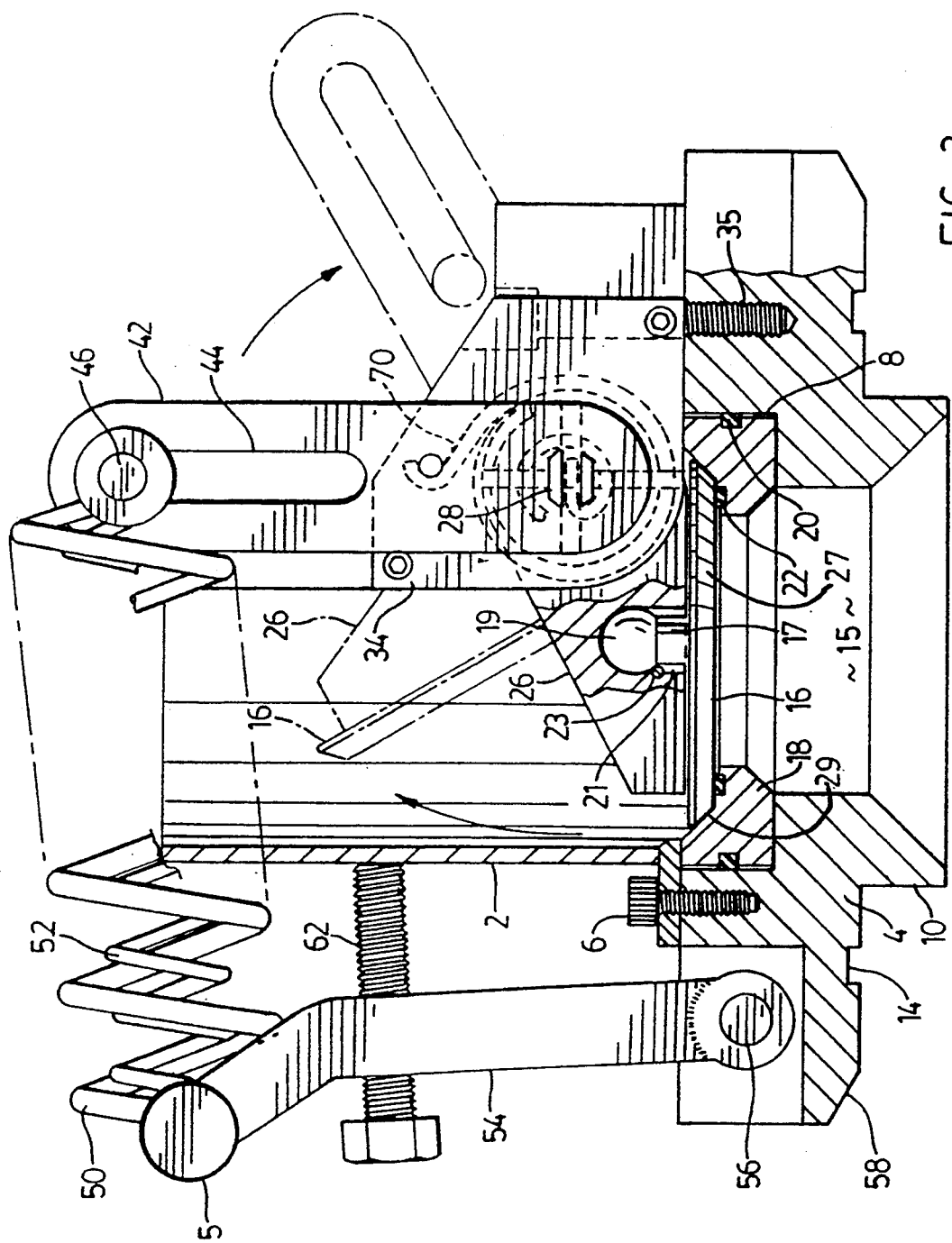

The valve shown in the drawings represents an improvement upon that of my U.S. Pat. No. 4,856,547, but is generally similar to that valve in many respects.

Referring to the drawings, a relief valve has a body 2 secured by screws 6 to a flange 4 for attachment over an orifice in the exterior wall of a vessel for containing pressurised fluid, typically a tank car conveying liquified petroleum gas or other volatile flammable and/or toxic liquid. In order to obtain a good seal between the valve and the tank wall, a portion 10 of the flange enters the orifice, the flange 4 is secured by bolts through holes 12 to the wall of the vessel, and a seal is provided in a groove 14 between the wall and the flange 4.

The valve body and the flange define a longitudinal passage which is normally closed by a flap valve 16 having a fustonconical valve surface 27 engaging a complimentary frustoconical valve surface 29 on a valve seat 18 secured within a bore 8 in the flange 4 by the body 2. An O-ring 20 surrounds on the external periphery of the valve seat 18, which is of slightly smaller diameter (for example by about 1 mm for a valve O-ring seat external diameter of about 10 cm) than the bore 8, the resistance of the O-ring thus permitting a small degree of float of the valve seat in its own plane.

A gas tight seal between the valve 16 and the seat 18 is assured by an O-ring 22 located in a groove in the seat beneath the periphery of the valve 16, but the arrangement is such that substantial sealing of the valve can take place through mating engagement of the valve surfaces 27 and 29 even in the absence of the O-ring. The flap valve 16 is supported by an arm 26 on a shaft 28 extending perpendicular to the longitudinal axis of the passage and to one side of it. In order to permit the valve 16 to align its surface 27 accurately with the surface 29 on the seat 18, the valve 16 is provided with an axial spigot 17 with a ball head 19 which enters a bore 21 in the arm 26, this bore having a hemispherical end portion receiving the head 19, which is retained in the bore by a pin 23 so as to provide a universal joint between the arm and the valve which allows a small degree of pivotal motion of the latter so that it can accommodate minor misalignments of the valve seat 18.

The shaft 28 is supported by bushings in bearings 30 to either side of a vertical slot 32 which accommodates the arm 26 when the flap valve is open and is formed in a support block 34 abutting the valve body 2 and secured by screws 35 to the flange 4. The block 34 oblates the portion of the valve passage above the seat such that when the flap valve 16 is fully open and lying against the block 34, the cross-sectional area of the passage is more or less constant from the valve seat upwards.

The bearings 30 for the shaft 28 are located at the inner ends of bores 36 in the block 34. Housed within the bores 36 and coaxial with the shaft 28 are helical torsion springs 70, anchored at their one ends to the shaft and at their other ends to the body 2, the springs being preloaded so as to apply a predetermined closing torque to the flap valve 16, tending to maintain it in sealing engagement with the valve seat 18 against the pressure of the contents of the vessel. As the valve opens, the springs will maintain a closing torque on the valve. The shaft and springs are retained in situ by crank arms 42 secured to each end of the shaft.

Each crank arm 42, which extends vertically when the valve is closed, is formed with a longitudinal slot 44 at its distal end within which is retained a sliding cross-shaft 46 formed with a groove 48 which engages an end loop of two concentric tension springs 50 and 52. A further arm 54 is supported for pivotal movement relative to the body by a pivot pin 56 extending parallel to the shaft 28 through a portion 58 of the flange 4 on the opposite side to the block 34, the lower end of the arm being accommodated in a slot 60 in the flange. A minimum inclination of this arm to the vertical axis of the body is maintained by a set screw 62 acting on a wall of the body above the portion 58. A cross bar 64 at the distal end of the arm 54 carries at each end fixed bosses 68 formed with grooves 66 which engage opposite end loops of the springs 50 and 52. The arms 42 and grooves 66 are offset laterally with respect to the body so that the springs 50 and 52 are supported clear of the latter.

In use, the set screw 62 is adjusted so that the sum of the closing forces exerted by the springs 50, 52 and 70 in the valve 16 is such that the valve will not commence to open unless the pressure within the vessel exceeds a predetermined value, for example 1750 kilopascals. Typically most of this closing force will be exerted by the springs 50 and 52, the balance being provided by the springs 70. As pressure continues to rise within the vessel, the valve opens further, and the return force applied by the springs initially increases. However, the arms 42 move increasingly away from the vertical as the flap valve opens, until the cross-shaft 46 slides down the slots 44, thus reducing the effective leverage of the arms, which leverage is ultimately further reduced by the decreasing angle included between the spring and the arm. This reduced leverage produces the effect that once a certain degree of opening of the valve is obtained, the valve will then move to the fully open position without further increase in pressure within the vessel. This is a desired characteristic in relief valves, since minor venting of excess pressure can occur without full opening of the valve, whilst full opening of the valve can be obtained under emergency conditions without substantial overpressure. The approximately constant and substantially unobstructed cross-section of the valve passage when the valve is open assists in maximizing the flow of either gas or liquid through a valve of given dimensions when the valve is open. Closing characteristics of the valve will normally be the inverse of those described for opening. Further control over opening characteristics can be obtained by combining springs 50 and 52 of different elongation characteristics.

Under conditions of extreme temperature, for example when the vessel is involved in a serious fire, the springs 50 and 52 serve an additional function. Any fire involving the vessel in a manner likely to threaten the structural integrity of its walls, whether due to combustion of material not originating from the vessel, or combustion of material vented from the vessel, will probably also impinge on the springs 50 and 52, which are supported clear of the valve body and in a manner such as provides a considerable degree of thermal isolation from the remainder of the valve structure. The spring will thus respond to the application of combustion heat with relatively little thermal inertia and, in the presence of combustion conditions such as to seriously threaten the integrity of the vessel by weakening its walls, will reach a temperature such that, with suitable choice of spring material, the latter will lose some or all of its spring temper. Consequently, the closing force applied to the valve will be reduced, thus also reducing the effective opening pressure of the valve, and permitting the vessel to be vented down to a pressure which can be safely sustained even if its wall strength has been thermally impaired. At the same time, the springs 70 are enclosed within the valve body adjacent the passage 14, where they are protected from direct thermal exposure, and will be cooled by gas or liquid passing through the passage 14. Assuming normal grades of spring steel, these springs should retain their spring temper even under fire conditions for at least as long as any pressurised fluid remains in the vessel, and are thus available to provide reclosing of the valve in the event that unrestricted venting is no longer required to maintain the internal pressure of the vessel at a safe level. At this point the O-rings 20, 22 may have been destroyed if the temperature of the valve seat rises above the decomposition or melting point of the O-ring material despite the cooling effect of fluid passing through the valve, but a substantial degree of closure will be obtained through metal-to-metal contact between the valve, the seat, the body and the flange. The closing pressure applied by the secondary springs is preferably selected having regard to the characteristics of a fluid being contained so that it is at least equal to the vapour pressure of the fluid at some moderately elevated temperature, thus permitting reclosure of the valve as the temperature of the remaining fluid in the vessel falls below that temperature. By utilizing springs 50, 52 of different composition and temper, further control of closing characteristics after fire exposure can be obtained, for example by arranging that the springs 52 retain their temper at a substantially higher temperature than the springs 50, thus maintaining a closing force which can be matched better to the degree of heat exposure of the valve.

The installed valve may be protected by a metal or plastic cover or shroud so as to avoid foreign matter from entering the valve mechanism, and to prevent tampering with the set screw 62 which determines the initial opening pressure of the valve. Such a cover should be designed so that it will be blown off or open in the event of any substantial opening of the valve, and will not offer any significant protection to the springs 50 and 52 from fire exposure in the event of a serious fire enveloping the vessel.

The above described embodiment is exemplary only, and various modifications are possible within the scope of the appended claims. For example, the springs 50 and 52 and associated parts may be present upon only one side of the body, or the spring 50 could be placed on one side and the spring 52 on the other, although the duplication of the springs provides a more evenly stressed structure. The primary and secondary springs may have different configurations from those described provided that they are arranged to provide similar functionality. The material used to form the springs 50 and 52 may vary according to application. The mounting of these springs is such that exposure to fire of an intensity sufficient to produce substantial reduction in the wall strength of the vessel will bring the central coiled portion of the spring to a bright red heat easily sufficient to destroy the spring temper of most conventional spring steels. By selection of other resilient alloys, springs 50 and/or 52 can be provided which will lose their spring temper at a substantially lower temperature.

I claim:

1. An emergency pressure relief valve for a vessel containing pressurized fluid comprising a valve body defining a valve passage through the body from a first end communicating with the interior of the vessel to a second end communicating with the ambient atmosphere, a valve seat within and surrounding the passage, a flap valve, a shaft supporting the flap valve through an arm for rotation about an axis perpendicular to a longitudinal axis of the passage between a first position closing the passage and in fluid tight engagement with the valve seat and a second position within the body in which it does not substantially obstruct the passage, and spring means acting between the shaft and the body to urge the flap valve into said first position with a torque sufficient to retain the flap valve in said first position when the pressure difference between the first and second ends of the passage is less than a predetermined value, wherein said flap valve and said arm are separately formed, and a universal joint connects the flap valve and the arm such as to permit limited pivotal motion of the flap valve relative to the arm, the flap valve and the valve seat have complementary frusto-conical valve surfaces which mate in said first position, a sealing ring is positioned to act between the valve seat and the flap valve in said first position to establish a gas tight seal, and the valve seat is located by an O-ring within a bore in the valve passage of the relief valve having a diameter slightly greater than an external diameter of the valve seat whereby to permit a limited degree of movement of the valve seat in its own plane.

2. A valve according to claim 1, wherein the flap valve has an axial spigot with a ball head entering a bore in the arm terminated by a hemispherical surface mating with the ball head, and means are provided to retain the ball head within the bore whilst permitting a limited degree of pivotal motion therebetween.

3. A valve according to claim 2, wherein said spring means includes at least one spring disposed for exposure to the thermal ambience of the vessel to which the valve is applied, the spring being made of a material which loses its spring temper on exposure to a thermal ambience likely to result in substantial weakening of walls of the pressure vessel, whereby substantially to reduce the closing torque applied by said spring means to the valve after exposure of the spring to such a thermal ambience.

4. A valve according to claim 3, wherein said spring means includes at least two springs disposed for exposure to the thermal ambience of the vessel, the springs being such as to lose their temper at different temperatures.

* * * * *